April 20, 1965

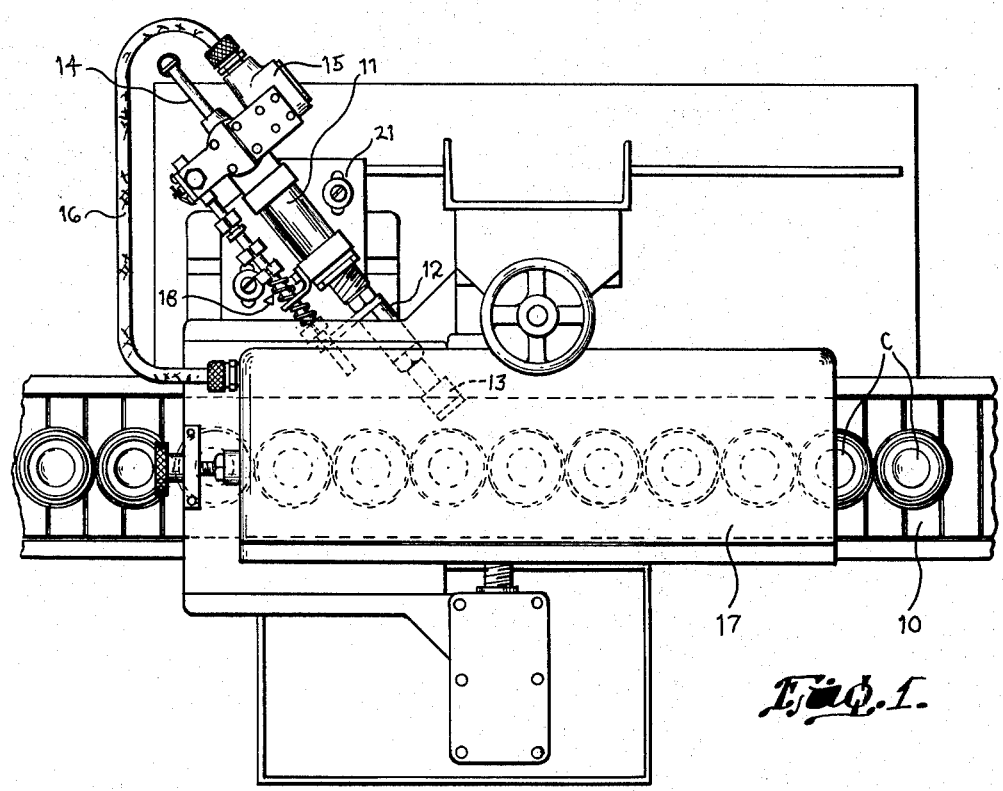
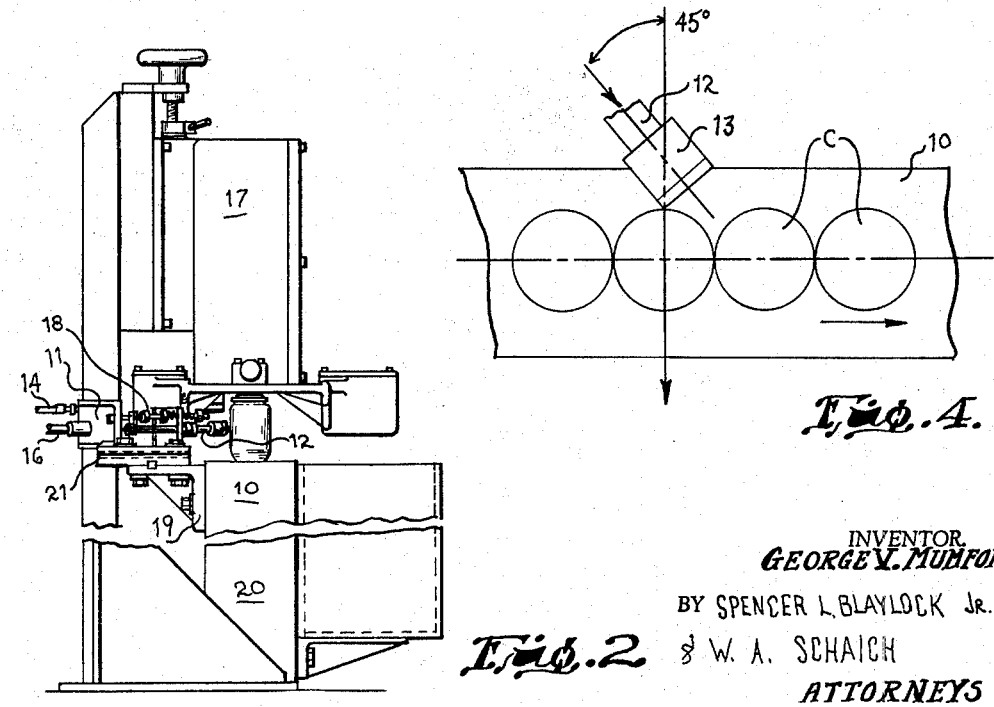

G. V. MUMFORD 3,179,228

CONTAINER EJECTING APPARATUS

Filed Jan. 30, 1962

INVENTOR.
GEORGE V. MUMFORD
BY SPENCER L. BLAYLOCK JR.
& W. A. SCHAICH
ATTORNEYS

United States Patent Office 3,179,228
Patented Apr. 20, 1965

3,179,228
CONTAINER EJECTING APPARATUS
George V. Mumford, Toledo, Ohio, assignor to Owens-Illinois Glass Company, a corporation of Ohio
Filed Jan. 30, 1962, Ser. No. 169,770
4 Claims. (Cl. 198—24)

This invention relates generally to a method and apparatus for ejecting containers and more particularly to a method and apparatus for removing certain containers from a series or succession of containers being advanced along a given path.

In the packaging of food products, particularly baby food, the containers are filled, and sealed in such a fashion that a vacuum is created in the sealed container. If a vacuum was not created, it is an indication that the proper seal was not obtained. Thus, it is desirable that those containers in which a vacuum was not created, be separated from those in which one was created.

An apparatus for the detection of the absence or presence of a vacuum in a filled container is disclosed in a copending application, Serial No. 85,442, filed December 29, 1960, now Patent No. 3,131,815, in the name of Benny B. Mathias entitled "Inspecting Sealed Containers for Vacuum." This application is owned by the common assignee of the present application. In the utilization of such or similar testing equipment, there has arisen a need for a method and apparatus for insuring that the defective container when detected is removed from the remaining containers without disturbing the travel of the remaining containers.

It is therefore an object of the present invention to provide a method and apparatus for removing selected containers from a series or succession of containers being advanced along a given path, without disturbing either immediately preceding and/or succeeding containers, even where they are in physical contact with one another and moving at high speed.

Another object of my invention is the provision of novel ejecting apparatus in which a reciprocable rubber-tipped ram, operating at extremly high speed and with a short stroke, is so angularly positioned relative to the container path of travel and operatively so timed with respect to advance of the containers that the ram momentarily initially strikes the selected container a sharp, glancing blow in an area laterally remote from the center line of its path of advance and thereupon is quickly retracted from the container path.

A further object of my invention is the provision of ejecting apparatus of the above character in which the center line of the path of ram travel is at an angle of about 45° to the center line of the path of travel of the line of containers, with the result that a selected container, when sharply struck by the ram head, moves to one side of said path of travel and advances slightly all to the end that lateral shifting of either the immediately preceding or succeeding container is completely avoided. In other words the path of travel of a container being ejected will be generally at an angle about perpendicular to the path of advance of the main line of containers.

These and other objects of this invention will become apparent from a reading of the following detailed description taken in conjunction with the drawings wherein:

FIGURE 1 is a fragmentary top plan view showing my invention in operating relationship to mechanism for testing sealed containers for the presence or absence of a vacuum.

FIGURE 2 is an end view of the apparatus shown in FIGURE 1.

FIGURE 4 is a detailed plan view showing the ram head at the point of contact with a selected container.

Figure 3:
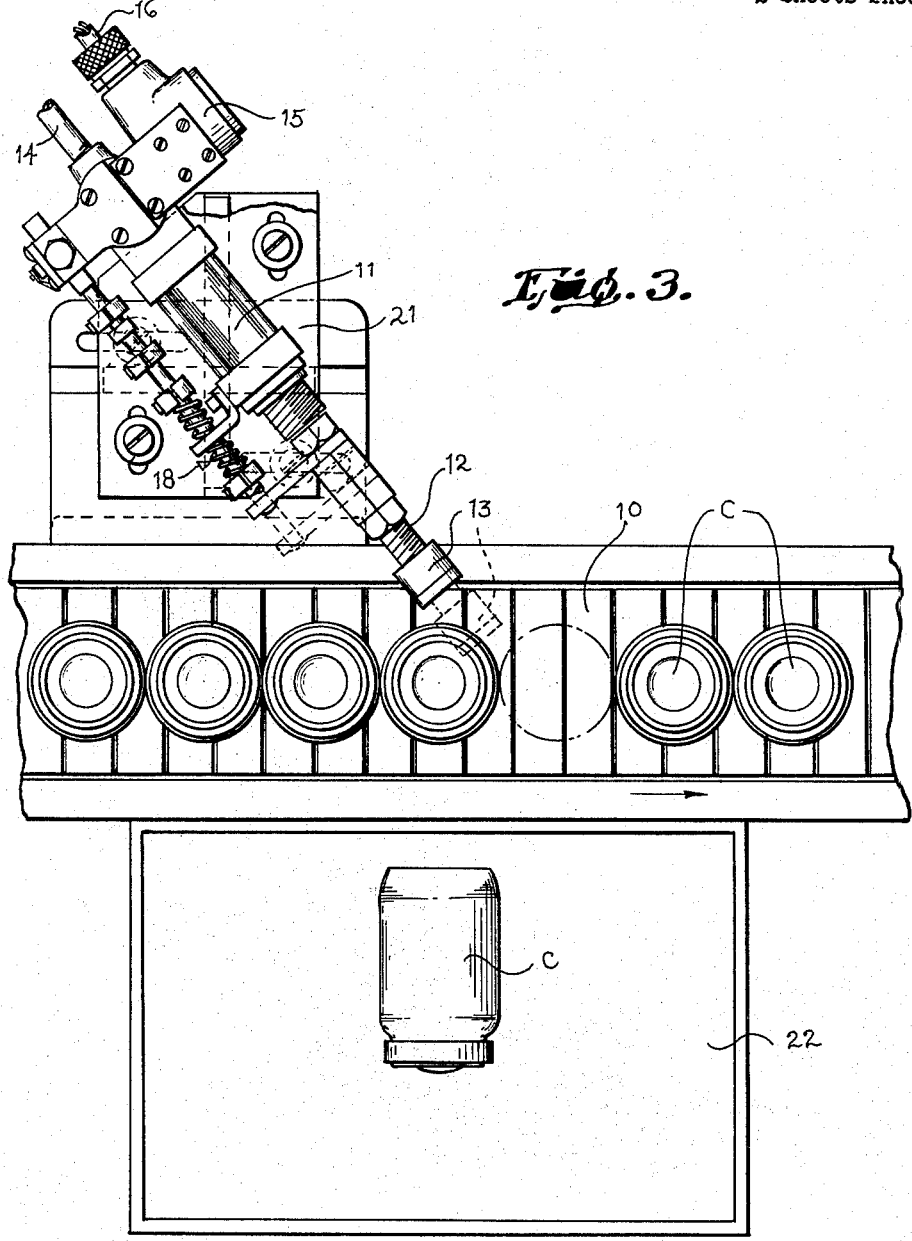
FIGURE 3 is a top plan view similar to FIGURE 1 but with the vacuum testing device removed to better reveal the ejecting apparatus.

My invention, although very obviously well adapted for use with other mechanism, is illustrated as being used in conjunction with container apparatus such as that disclosed in the above-identified copending application for patent Serial No. 85,442 filed December 29, 1960, in the name of Benny B. Mathias, entitled "Inspecting Sealed Containers for Vacuum," and primarily directed to a testing mechanism and method as distinguished from container ejecting apparatus.

In its illustrated embodiment the apparatus of this invention is arranged alongside of a horizontal conveyor 10 upon which filled and capped containers C are positioned upright. The conveyor 10 continuously moves the containers C successively beneath the apparatus as revealed in the Mathias application at a high rate of speed on the order of 600 containers per minute and maybe as high or higher than a thousand containers per minute. As the containers move past the testing and ejecting station, beams of light are continuously directed downwardly from the testing apparatus so that they can be intercepted by the closures of the containers C. If the container C is not properly vacuumized, the closure cap panel will bulge upwardly and reflect the light beam onto a light sensitive element. The reception of the light beam by the light sensitive element results in the production of a series of electrical pulses. These pulses initiate operation of the container ejecting apparatus of my invention.

This apparatus comprises a horizontal air cylinder, or piston motor 11, axially adjustably connected to a ram 12 which has a rubber-tipped or otherwise cushioned head 13 at its free outer end for engagement with the containers to be ejected. An air supply conduit 14 is connected to the air cylinder. A solenoid valve 15 functions to control the flow of air from said conduit 14 to the motor and this valve in turn is connected by an electric conductor cable 16 to the testing apparatus enclosed in the hood 17. A simple spring return device 18 mounted upon the piston motor 11 and connected to the ram functions to quickly retract the latter following each container ejecting stroke. A bracket 19 or mounting plate (FIGS. 1 and 2) supports the piston motor and associated parts and is adjustable vertically and angularly in a horizontal plane. The inverted L-shaped bracket can be adjusted vertically on the frame 20 and the plate 21 which overlies this bracket is capable of angular adjustment, so well as shifting alongside the conveyor to properly locate the same relative to the ejecting station.

The angular position of the piston motor and ram relative to the line of travel of the containers and the point of impingement of the ram head upon the containers are the critical important aspects of my invention. Accordingly the axis of the ram is disposed at an angle of just about, if not exactly, 45° to the normal path of advance of the center line of the containers and the ejecting device is so positioned alongside the conveyor that when projected the ram head strikes the selected container a glancing blow in that area most remote from the center line of the series of containers. Moreover the point of contact is substantially at the center of gravity of the container so as to avoid tipping the container.

In operation, a container C enters the testing zone where a beam of light is directed against the closure of the container C. If the container is not properly vacuumized, a series of electrical pulses will be generated. The apparatus and circuitry of this operation is disclosed in the copending Mathias application. The pulses energize the solenoid of valve 15 thereby opening the valve and admitting air to the motor 11. The motor 11 advances the ram 12 a short distance at high speed. The cushioned head 13 on the free outer end of the ram 12 strikes the defectively sealed container a sharp glancing blow which causes the same to move laterally to the opposite side of the conveyor 10.

The blow is sufficiently hard to knock the container off the conveyor and onto a receiving station 22 as is more clearly shown in FIGURE 3. The path of travel of the rejected container is substantially perpendicular to the center line of the path of travel of the main line of containers as a result of the container being struck a glancing blow at its margin most remote from its center.

As soon as the container is struck, the ram 12 retracts in order that the rapidly moving containers will not strike the ram while in its projected position. The center line of the path of travel of the ram 12 and the path of travel of the ejected container form an obtuse angle of almost, if not exactly 135 degrees.

By positioning the ram relative to the conveyor 10, in such a fashion that its center line of travel forms a 45° angle with the center line of travel of the container C and in such a fashion that the ram head 13 strikes the container at the point on its periphery most remote from the container center, applicant found that containers could be ejected without disturbing either the preceding or succeeding containers.

The exact position of the ejecting apparatus will in part be determined by the diameter of the container.

It will be apparent from a reading of the foregoing that this apparatus while described as used in conjunction with the Mathias testing apparatus may be utilized with other testing apparatus which determines that a container is defective.

Various modifications may be resorted to within the spirit and scope of the following claims.

I claim:
1. In apparatus for removing a selected container from a series of containers position upright upon a horizontal conveyor and being successively moved thereby past an ejecting station, a horizontally reciprocable ram positioned at one side of the conveyor for movement along a path disposed at an angle of about 45° to the path of travel of the containers, said ram being provided with a container contacting face, which face is disposed at approximately the same angle to said path as said ram, and means for projecting and retracting the ram while only a selected container is positioned at said station whereby that portion of the ram face closest to the center line of a series of containers contacts only the selected container in a side surface area most remote from the center line of the series of containers.

2. Apparatus as defined in claim 1, the stroke of the ram being high speed and of a length substantially less than the diameter of the containers.

3. Apparatus as defined in claim 1, a piston-type air-motor for reciprocating the ram and a solenoid valve for controlling the delivery of air under pressure to the motor.

4. Apparatus as defined in claim 2, and means for regulably controlling the length of the ram stroke.

References Cited by the Examiner
UNITED STATES PATENTS

| | | | |
|---|---|---|---|
| 2,717,086 | 9/55 | Bush | 198—24 X |
| 2,822,910 | 2/58 | Wachsmuth | 198—24 |
| 2,987,179 | 6/61 | Allgeyer | 209—74 |
| 2,990,965 | 7/61 | Small | 209—74 |

SAMUEL F. COLEMAN, Acting Primary Examiner.
WILLIAM B. LA BORDE, Examiner.